United States Patent
Mastro et al.

(10) Patent No.: US 10,107,142 B2
(45) Date of Patent: Oct. 23, 2018

(54) FAN DRIVE GEAR SYSTEM AUXILIARY PUMP MONITORING SYSTEM

(71) Applicant: United Technologies Corporation, Hartford, CT (US)

(72) Inventors: Jacob Peter Mastro, Glastonbury, CT (US); Francis Parnin, Suffield, CT (US)

(73) Assignee: United Technologies Corporation, Farmington, CT (US)

( * ) Notice: Subject to any disclaimer, the term of this patent is extended or adjusted under 35 U.S.C. 154(b) by 281 days.

(21) Appl. No.: 14/917,970

(22) PCT Filed: Sep. 8, 2014

(86) PCT No.: PCT/US2014/054501
§ 371 (c)(1),
(2) Date: Mar. 10, 2016

(87) PCT Pub. No.: WO2015/076903
PCT Pub. Date: May 28, 2015

(65) Prior Publication Data
US 2016/0215652 A1    Jul. 28, 2016

Related U.S. Application Data

(60) Provisional application No. 61/877,415, filed on Sep. 13, 2013.

(51) Int. Cl.
*F02K 3/02* (2006.01)
*F01D 25/20* (2006.01)
(Continued)

(52) U.S. Cl.
CPC ............. *F01D 25/20* (2013.01); *F01D 17/08* (2013.01); *F01M 11/067* (2013.01); *F02C 7/06* (2013.01);
(Continued)

(58) Field of Classification Search
CPC ....... F01D 17/08; F01D 25/20; F01M 11/067; F01M 2001/123; F02C 7/06; F02C 7/36;
(Continued)

(56) References Cited

U.S. PATENT DOCUMENTS

| | | | | |
|---|---|---|---|---|
| 2,830,668 | A | * | 4/1958 | Gaubis .................... B64C 11/40 416/157 R |
| 3,976,165 | A | * | 8/1976 | Pilarczyk .............. F01D 25/186 184/6.1 |

(Continued)

FOREIGN PATENT DOCUMENTS

| | | |
|---|---|---|
| EP | 1925856 A2 | 5/2008 |
| WO | 2011/161515 A1 | 12/2011 |

OTHER PUBLICATIONS

European Search Report for EP Application No. 14864950.2 dated Apr. 19, 2017.

(Continued)

*Primary Examiner* — Jesse Bogue
(74) *Attorney, Agent, or Firm* — Carlson, Gaskey & Olds, P.C.

(57) ABSTRACT

A disclosed lubrication system for turbofan engine includes a primary lubricant circuit, a primary pump driving lubricant through the primary circuit, an auxiliary lubricant circuit in communication with the primary lubricant circuit and an auxiliary lubricant pump driving lubricant through the auxiliary lubricant circuit. A first valve downstream of an outlet of auxiliary lubricant pump separates the auxiliary lubricant circuit from the primary lubricant circuit. A sensor is disposed within the auxiliary lubricant circuit for sensing pressure within the auxiliary lubricant circuit separate from a pressure within the primary lubricant circuit.

13 Claims, 2 Drawing Sheets

(51) Int. Cl.
   *F02C 7/06* (2006.01)
   *F01D 17/08* (2006.01)
   *F02C 7/36* (2006.01)
   *F16H 57/04* (2010.01)
   *F01M 11/06* (2006.01)
   *F01M 1/12* (2006.01)

(52) U.S. Cl.
   CPC ........... *F02C 7/36* (2013.01); *F16H 57/0441* (2013.01); *F01M 2001/123* (2013.01); *F05D 2260/40311* (2013.01); *F05D 2260/80* (2013.01); *F05D 2260/98* (2013.01); *F05D 2270/3013* (2013.01)

(58) Field of Classification Search
   CPC ....... F05D 2260/40311; F05D 2260/80; F05D 2260/98; F05D 2270/3013; F16H 57/0441
   See application file for complete search history.

(56) References Cited

U.S. PATENT DOCUMENTS

| | | | |
|---|---|---|---|
| 4,431,372 A * | 2/1984 | Dadhich | F01D 25/20 184/27.2 |
| 4,531,485 A * | 7/1985 | Murther | F01M 1/16 123/196 R |
| 5,180,034 A | 1/1993 | Lopes | |
| 6,886,324 B1 * | 5/2005 | Handshuh | F01D 25/20 60/39.08 |
| 8,020,664 B2 | 9/2011 | Cornet et al. | |
| 8,020,665 B2 | 9/2011 | Sheridan et al. | |
| 8,181,746 B2 | 5/2012 | Szolomayer et al. | |
| 8,215,454 B2 | 7/2012 | Portlock et al. | |
| 8,230,974 B2 * | 7/2012 | Parnin | F01D 25/18 184/6.11 |
| 8,307,626 B2 | 11/2012 | Sheridan | |
| 2004/0255656 A1 | 12/2004 | Rafei | |
| 2006/0054406 A1 | 3/2006 | Delaloye | |
| 2008/0116009 A1 * | 5/2008 | Sheridan | F01D 25/18 184/6.4 |
| 2010/0213010 A1 | 8/2010 | Cornet et al. | |
| 2010/0294597 A1 | 11/2010 | Parnin | |
| 2012/0241258 A1 | 9/2012 | Subramaniam et al. | |
| 2013/0319798 A1 * | 12/2013 | Sheridan | F01D 25/20 184/6.11 |

OTHER PUBLICATIONS

International Preliminary Report on Patentability for International Application No. PCT/US2014/054501 dated Mar. 24, 2016.
International Search Report and Written Opinion for International Application No. PCT/US2014/054501 dated Jun. 11, 2015.

* cited by examiner

FAN DRIVE GEAR SYSTEM AUXILIARY PUMP MONITORING SYSTEM

CROSS REFERENCE TO RELATED APPLICATION

This application claims priority to U.S. Provisional Application No. 61/877,415 filed on Sep. 13, 2013.

BACKGROUND

A gas turbine engine typically includes a fan section, a compressor section, a combustor section and a turbine section. Air entering the compressor section is compressed and delivered into the combustion section where it is mixed with fuel and ignited to generate a high-energy exhaust gas flow. The high-energy exhaust gas flow expands through the turbine section to drive the compressor and the fan section. The compressor section typically includes a first (low) pressure compressor and a second (high) pressure compressor, and the turbine section includes low and high-pressure turbines.

A speed reduction device such as an epicyclical gear assembly may be utilized to drive the fan section such that the fan section may rotate at a speed different than the turbine section so as to increase the overall propulsive efficiency of the engine. In such engine architectures, a shaft driven by one of the turbine sections provides an input to the epicyclical gear assembly that drives the fan section at a reduced speed such that both the turbine section and the fan section can rotate at closer to optimal speeds.

Lubrication of the speed reduction device is provided to maintain thermal and power transfer efficiencies. During normal operations a primary lubrication system supplies lubricant at a desired flow rate and pressure. An auxiliary lubrication system may also be included to provide lubrication during periods in which the primary lubrication system may not provide sufficient lubrication such as during extreme aircraft maneuvers. Pressure sensors within the lubrication system monitor lubricant pressures and detect any fault conditions. Pressure within the auxiliary lubricant circuit is pressurized by the primary system during normal operations and therefore detecting pressures to monitor the health of the auxiliary system provides only limited accuracy.

Accordingly, engine manufacturers continually seek improvements in operational efficiency and monitoring to maintain engine functionality.

SUMMARY

A lubrication system for a turbofan engine according to an exemplary embodiment of this disclosure, among other possible things includes a primary lubricant circuit, a primary pump configured to drive lubricant through the primary lubricant circuit, an auxiliary lubricant circuit in communication with the primary lubricant circuit, an auxiliary lubricant pump configured to drive lubricant through the auxiliary lubricant circuit, a first valve downstream of an outlet of the auxiliary lubricant pump for separating the auxiliary lubricant circuit from the primary lubricant circuit, and a sensor disposed within the auxiliary lubricant circuit and configured to sense a condition of lubricant within the auxiliary lubricant circuit separate from a condition of lubricant within the primary lubricant circuit.

In a further embodiment of the foregoing, the sensor disposed within the auxiliary lubricant circuit is configured to sense a pressure within the auxiliary lubricant circuit separate from a pressure within the primary lubricant circuit.

In a further embodiment of any of the foregoing, the first valve comprises a check valve that is configured to prevent lubricant flow into the auxiliary circuit from the primary circuit.

In a further embodiment of any of the foregoing, the sensor is disposed between the outlet of the auxiliary pump and the first valve.

In a further embodiment of any of the foregoing, the sensor is configured to provide information indicative of the pressure within the auxiliary lubricant circuit to a controller.

In a further embodiment of any of the foregoing, an auxiliary lubricant reservoir that is configured to supply lubricant to the auxiliary lubricant pump.

In a further embodiment of any of the foregoing, the auxiliary lubricant pump configured to draw lubricant from a lubricant sump and the auxiliary lubricant reservoir.

In a further embodiment of any of the foregoing, a second valve configured to control lubricant flow between the primary lubricant system and the auxiliary lubricant system, wherein the second valve is disposed downstream of the first valve.

In a further embodiment of any of the foregoing, the primary lubricant circuit is configured to direct lubricant to a fan drive gear system.

A turbofan engine according to another exemplary embodiment of this disclosure, among other possible things includes a fan, a turbine section, a geared architecture configured to be driven by the turbine section for rotating the fan about the axis, a primary lubricant circuit configured to supply lubricant to the geared architecture, an auxiliary lubricant circuit configured to supply lubricant to the primary lubricant circuit to supplement a lubricant supply, the auxiliary lubricant circuit including an auxiliary pump and a sensor configured to monitor a pressure within the auxiliary lubricant circuit separate from a pressure within the primary lubricant circuit.

In a further embodiment of the foregoing, a first valve downstream of an outlet of the auxiliary pump and configured to prevent communication of a pressure within the primary lubricant circuit into the auxiliary lubricant circuit.

In a further embodiment of any of the foregoing, the sensor is configured to generate a signal indicative of a pressure between the outlet of the auxiliary pump and the first valve.

In a further embodiment of any of the foregoing, a controller configured to receive the signal from the sensor and programmed to indicate a fault condition responsive to the signal indicating a pressure below a predefined threshold pressure.

In a further embodiment of any of the foregoing, a second valve configured to control lubricant flow between the primary lubricant circuit and the auxiliary lubricant circuit responsive to conditions within the primary lubricant circuit.

In a further embodiment of any of the foregoing, an auxiliary lubricant supply configured to receive lubricant flowing through the geared architecture for supplying lubricant to the auxiliary lubricant pump.

A method of monitoring a lubrication system for a turbofan engine according to another exemplary embodiment of this disclosure includes separating lubricant pressure within a primary lubricant circuit from pressure within an auxiliary lubricant circuit, and monitoring the pressure within the auxiliary lubricant circuit separate from lubricant within the primary lubricant circuit.

In a further embodiment of the forgoing method, pressure within the auxiliary circuit is separated from pressure within the primary circuit with a check valve.

In a further embodiment of the forgoing method pressure within the auxiliary lubricant circuit is monitored with a sensor disposed between an outlet of an auxiliary pump and the check valve.

In a further embodiment of the forgoing method a signal indicative of pressure within the auxiliary circuit is communicated to a controller and a fault condition of the auxiliary pump is indicated responsive to the indicated pressure being outside predefined limits Although the different examples have the specific components shown in the illustrations, embodiments of this disclosure are not limited to those particular combinations. It is possible to use some of the components or features from one of the examples in combination with features or components from another one of the examples.

These and other features disclosed herein can be best understood from the following specification and drawings, the following of which is a brief description.

DETAILED DESCRIPTION

Figure 1:
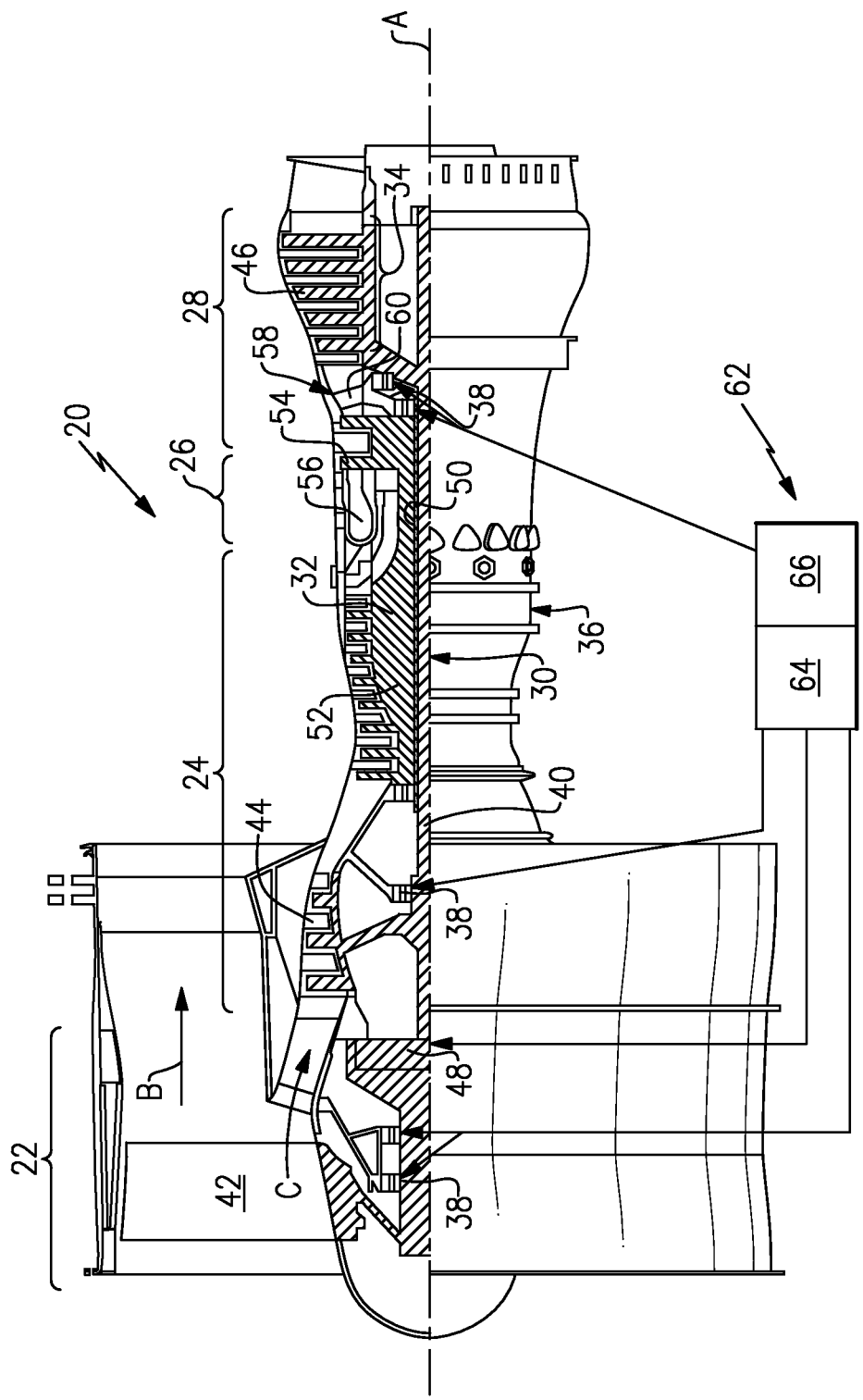
FIG. 1 is a schematic view of an example gas turbine engine.

FIG. 1 schematically illustrates an example gas turbine engine 20 that includes a fan section 22, a compressor section 24, a combustor section 26 and a turbine section 28. Alternative engines might include an augmenter section (not shown) among other systems or features. The fan section 22 drives air along a bypass flow path B while the compressor section 24 draws air in along a core flow path C where air is compressed and communicated to a combustor section 26. In the combustor section 26, air is mixed with fuel and ignited to generate a high-energy exhaust gas stream that expands through the turbine section 28 where energy is extracted and utilized to drive the fan section 22 and the compressor section 24.

Although the disclosed non-limiting embodiment depicts a two-spool turbofan gas turbine engine, it should be understood that the concepts described herein are not limited to use with two-spool turbofans as the teachings may be applied to other types of turbine engines; for example a turbine engine including a three-spool architecture in which three spools concentrically rotate about a common axis and where a low spool enables a low pressure turbine to drive a fan via a gearbox, an intermediate spool that enables an intermediate pressure turbine to drive a first compressor of the compressor section, and a high spool that enables a high pressure turbine to drive a high pressure compressor of the compressor section.

The example engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided.

The low speed spool 30 generally includes an inner shaft 40 that connects a fan 42 and a low pressure (or first) compressor section 44 to a low pressure (or first) turbine section 46. The inner shaft 40 drives the fan 42 through a speed change device, such as a geared architecture 48, to drive the fan 42 at a lower speed than the low speed spool 30. The high-speed spool 32 includes an outer shaft 50 that interconnects a high pressure (or second) compressor section 52 and a high pressure (or second) turbine section 54. The inner shaft 40 and the outer shaft 50 are concentric and rotate via the bearing systems 38 about the engine central longitudinal axis A.

A combustor 56 is arranged between the high-pressure compressor 52 and the high-pressure turbine 54. In one example, the high-pressure turbine 54 includes at least two stages to provide a double stage high-pressure turbine 54. In another example, the high-pressure turbine 54 includes only a single stage. As used herein, a "high pressure" compressor or turbine experiences a higher pressure than a corresponding "low pressure" compressor or turbine.

The example low-pressure turbine 46 has a pressure ratio that is greater than about 5. The pressure ratio of the example low-pressure turbine 46 is measured prior to an inlet of the low-pressure turbine 46 as related to the pressure measured at the outlet of the low-pressure turbine 46 prior to an exhaust nozzle.

A mid-turbine frame 58 of the engine static structure 36 is arranged generally between the high-pressure turbine 54 and the low-pressure turbine 46. The mid-turbine frame 58 further supports bearing systems 38 in the turbine section 28 as well as setting airflow entering the low pressure turbine 46.

Airflow through the core airflow path C is compressed by the low pressure compressor 44 then by the high pressure compressor 52 mixed with fuel and ignited in the combustor 56 to produce high speed exhaust gases that are then expanded through the high pressure turbine 54 and low pressure turbine 46. The mid-turbine frame 58 includes vanes 60, which are in the core airflow path and function as an inlet guide vane for the low-pressure turbine 46. Utilizing the vane 60 of the mid-turbine frame 58 as the inlet guide vane for low-pressure turbine 46 decreases the length of the low-pressure turbine 46 without increasing the axial length of the mid-turbine frame 58. Reducing or eliminating the number of vanes in the low-pressure turbine 46 shortens the axial length of the turbine section 28. Thus, the compactness of the gas turbine engine 20 is increased and a higher power density may be achieved.

The disclosed gas turbine engine 20 in one example is a high-bypass geared aircraft engine. In a further example, the gas turbine engine 20 includes a bypass ratio greater than about six (6), with an example embodiment being greater than about ten (10). The example geared architecture 48 is an epicyclical gear train, such as a planetary gear system, star gear system or other known gear system, with a gear reduction ratio of greater than about 2.3.

In one disclosed embodiment, the gas turbine engine 20 includes a bypass ratio greater than about ten (10:1) and the fan diameter is significantly larger than an outer diameter of the low-pressure compressor 44. It should be understood, however, that the above parameters are only exemplary of one embodiment of a gas turbine engine including a geared architecture and that the present disclosure is applicable to other gas turbine engines.

A significant amount of thrust is provided by airflow through the bypass flow path B due to the high bypass ratio. The fan section 22 of the engine 20 is designed for a particular flight condition—typically cruise at about 0.8 Mach and about 35,000 feet. The flight condition of 0.8 Mach and 35,000 ft., with the engine at its best fuel consumption—also known as "bucket cruise Thrust Specific Fuel Consumption ('TSFC')"—is the industry standard parameter of pound-mass (lbm) of fuel per hour being burned divided by pound-force (lbf) of thrust the engine produces at that minimum point.

"Low fan pressure ratio" is the pressure ratio across the fan blade alone, without a Fan Exit Guide Vane ("FEGV") system. The low fan pressure ratio as disclosed herein according to one non-limiting embodiment is less than about 1.50. In another non-limiting embodiment the low fan pressure ratio is less than about 1.45.

"Low corrected fan tip speed" is the actual fan tip speed in ft/sec divided by an industry standard temperature correction of $[(Tram\ °\ R)/(518.7\ °\ R)]^{0.5}$. The "Low corrected fan tip speed", as disclosed herein according to one non-limiting embodiment, is less than about 1150 ft/second.

The example gas turbine engine includes the fan 42 that comprises in one non-limiting embodiment less than about twenty-six (26) fan blades. In another non-limiting embodiment, the fan section 22 includes less than about twenty (20) fan blades. Moreover, in one disclosed embodiment the low-pressure turbine 46 includes no more than about six (6) turbine rotors schematically indicated at 34. In another non-limiting example embodiment the low-pressure turbine 46 includes about three (3) turbine rotors. A ratio between the number of fan blades 42 and the number of low-pressure turbine rotors is between about 3.3 and about 8.6. The example low-pressure turbine 46 provides the driving power to rotate the fan section 22 and therefore the relationship between the number of turbine rotors 34 in the low-pressure turbine 46 and the number of blades 42 in the fan section 22 discloses an example gas turbine engine 20 with increased power transfer efficiency.

A lubrication system 62 supplies lubricant to various features of the gas turbine engine 20 including the geared architecture 48 and the bearing assemblies 38. The example lubrication system 62 includes a primary circuit 64 and auxiliary circuit 66. The auxiliary circuit 66 supplies lubricant during periods where the primary circuit 64 is not able to provide lubricant at the desired flow rate and pressure to maintain engine operability within desired limits Referring to FIG. 2, with continued reference to FIG. 1, the primary circuit 64 includes a main pump 68 having an outlet 88 through which lubricant is pumped through a series of primary conduits 74. The main pump 68 draws lubricant from a main tank 70. The main tank 70, in turn, receives lubricant through a return line and from a scavenge pump 80 that draws lubricant from a sump 78. In operation, the main pump 68 pumps lubricant through the conduits 74 at a desired flow and pressure schematically indicated at 76.

Figure 2:
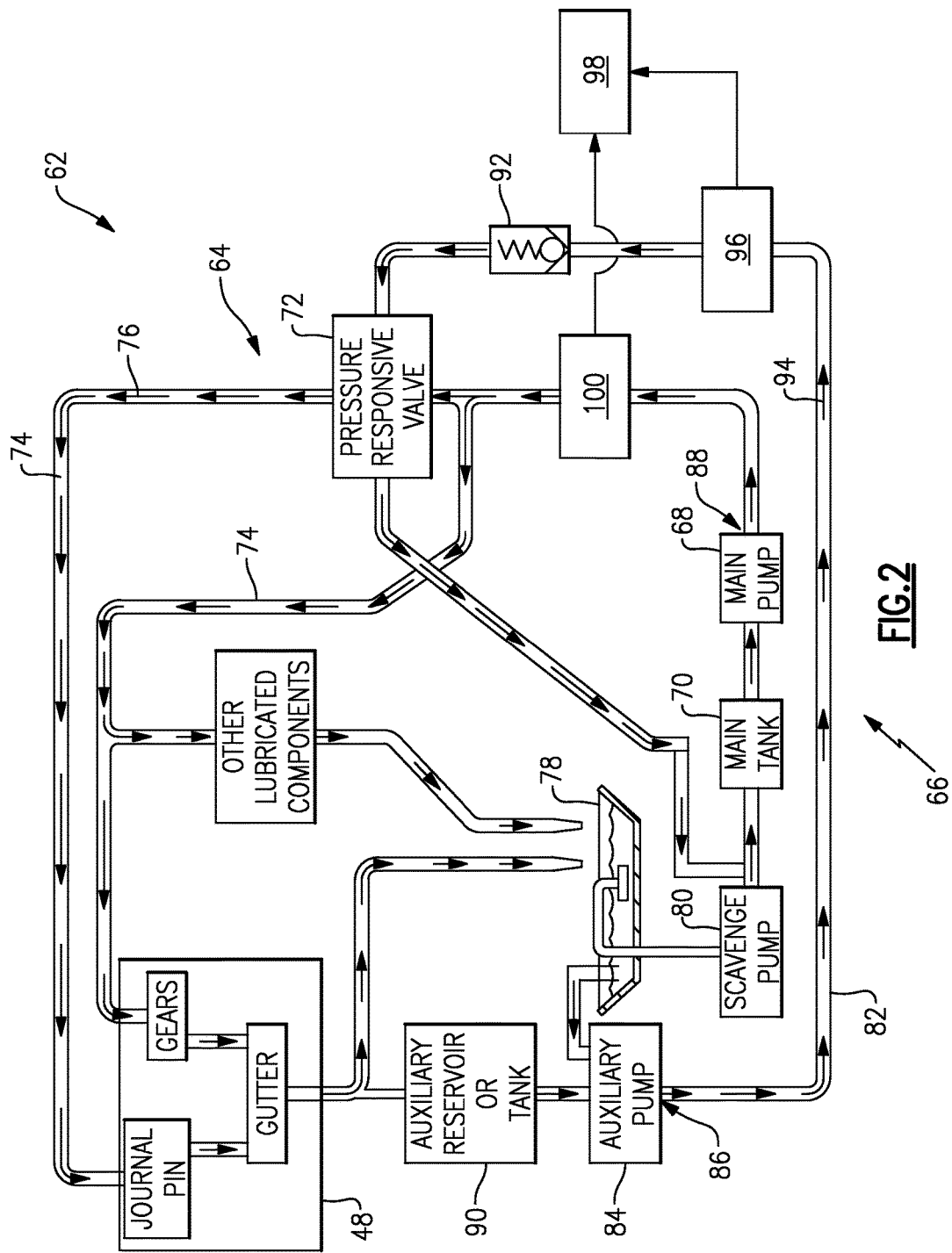
FIG. 2 is a schematic view of an example lubrication system.

In this example, conduits 74 communicate lubricant to the geared architecture 48 and to other lubricated components, such as the bearing assemblies 38 throughout the gas turbofan engine 20. As appreciated, only example features are illustrated in FIGS. 1 and 2 of structures that are provided lubricant by the example lubrication system 62. Other features and components within the turbofan engine 20 may also receive lubricant to maintain operability.

A pressure responsive control valve 72 is disposed within the primary circuit 64 and controls lubricant flow between the primary circuit 64 and the auxiliary circuit 66. The auxiliary circuit 66 includes conduits 82 that supply lubricant into the primary conduits 74 to maintain a supply of lubricant to the lubricated features and the geared architecture 48.

The auxiliary circuit 66 includes the conduits 82 through which an auxiliary lubricant flow indicated schematically at 94 is provided. The auxiliary pump 84 includes an outlet 86 and draws lubricant from an auxiliary reservoir tank 90 and also from the lubricant sump 78.

Because lubrication of the various components of the turbofan engine 20 is of critical importance, lubricant pressure and flow are monitored to detect any reduction in capability and to prevent an interruption of operation. The primary circuit 64 includes a primary pressure sensor 100 that communicates with a controller 98. The primary pressure sensor 100 senses pressure indicative of a lubricant pressure at the outlet 88 of the main pump 68. A reduced pressure sensed by the pressure sensor 100 is indicative of a possible fault with the main pump 68. If the pressure detected by the pressure sensor 100 is below a desired threshold, the controller 98 can recognize a fault with the main pump 68 and initiate actions required with a reduced flow level of lubricant within the primary circuit 64. Lubricant 76 within the primary passage is desired to be maintained at a specific pressure and flow rate to maintain sufficient lubricant for operation of the geared architecture 48 and the other lubricated components, such as the bearing assemblies 38.

The auxiliary circuit 66 is provided to supplement lubricant flow during extreme conditions, such as reduced or negative G conditions that can affect how lubricant flows to the various components of the turbofan engine. Accordingly, it is also desirable to monitor operation of auxiliary pump 84 to ensure that it is capable of providing lubricant at a desired flow and pressure during the reduced negative G conditions or other conditions where the primary lubricant system is not able to provide lubricant at the desired flows and pressures.

Because the main pump 68 of the primary circuit 64 provides a continuous flow and pressure, that pressure is also communicated to the outlet 86 of the auxiliary pump 84 and, therefore, any pressure sensor that is disposed within the auxiliary circuit 66 would provide a false pressure reading due to the communication of pressures from the primary circuit 64 being communicated back through the auxiliary conduits 82.

Accordingly, the auxiliary circuit 66 includes a pressure sensor 96 that senses and detects pressure within the auxiliary conduit 82 of the auxiliary circuit 66. The pressure indicated at 94 within the auxiliary circuit 66 is separated from the pressures within the primary circuit 64 by a check valve 92. The check valve 92 separates the pressures generated by the main pump 68 within the primary circuit 64 from the pressures 94 generated by the auxiliary pump 84 within the auxiliary circuit 66. Because the check valve 92 separates the auxiliary circuit 66 from the primary circuit 64, the pressures that are indicated by the pressure sensor 96 are indicative of the actual pressures within the auxiliary circuit 66 system and not those communicated through the conduits 74 from the primary circuit 64.

Accordingly, a reduction in pressure within the auxiliary circuit 66 detected by the pressure sensor 96 is indicative of a failure or other fault condition within the auxiliary circuit 66 separate from the primary circuit 64. The detection of the loss of pressure within the auxiliary circuit 66 separate from the primary circuit 64 provides for the detection and monitoring of the auxiliary pump 84 in an accurate manner without interference from pressures within the primary circuit 64.

Accordingly, the example lubricant system 62 includes features for monitoring both the primary circuit 64 and the auxiliary circuit 66 separately to assure operation of each of the main pump 68 and the auxiliary pump 84 separately.

Controller 98 monitors pressure within the primary circuit 64 and auxiliary circuit 66 and provides an indication that a fault or other low pressure condition is present responsive to a pressure within either of the primary or auxiliary circuits being below a predefined limit. The controller 98 can then take appropriate action to correct or alert of the low lubricant pressure condition.

Although an example embodiment has been disclosed, a worker of ordinary skill in this art would recognize that certain modifications would come within the scope of this disclosure. For that reason, the following claims should be studied to determine the scope and content of this disclosure.

What is claimed is:

1. A lubrication system for turbofan engine comprising:
   a primary lubricant circuit;
   a primary pump configured to drive lubricant through the primary lubricant circuit;
   an auxiliary lubricant circuit in communication with the primary lubricant circuit;
   an auxiliary lubricant pump configured to drive lubricant through the auxiliary lubricant circuit;
   a pressure responsive control valve disposed within the primary lubricant circuit for controlling lubricant flow between the primary lubricant circuit and the auxiliary lubricant circuit;
   a primary pressure sensor disposed within the primary lubricant circuit before the pressure responsive control valve;
   a check valve downstream of an outlet of the auxiliary lubricant pump and before the pressure responsive control valve, the check valve preventing lubricant flow into the auxiliary lubricant circuit from the primary lubricant circuit; and
   a pressure sensor disposed within the auxiliary lubricant circuit between the outlet of the auxiliary lubricant pump and the check valve, the pressure sensor configured to sense a pressure of lubricant within the auxiliary lubricant circuit separate from a pressure of lubricant within the primary lubricant circuit.

2. The lubrication system as recited in claim 1, wherein the pressure sensor is configured to provide information indicative of the pressure within the auxiliary lubricant circuit to a controller.

3. The lubrication system as recited in claim 1, including an auxiliary lubricant reservoir that is configured to supply lubricant to the auxiliary lubricant pump.

4. The lubrication system as recited in claim 3, wherein the auxiliary lubricant pump is configured to draw lubricant from a lubricant sump and the auxiliary lubricant reservoir.

5. The lubrication system as recited in claim 1, including a second valve configured to control lubricant flow between the primary lubricant system and the auxiliary lubricant system, wherein the second valve is disposed downstream of the first valve.

6. The lubrication system as recited in claim 1, wherein the primary lubricant circuit is configured to direct lubricant to a fan drive gear system.

7. A turbofan engine comprising:
   a fan;
   a turbine section;
   a geared architecture configured to be driven by the turbine section for rotating the fan about the axis;
   a primary lubricant circuit configured to supply lubricant to the geared architecture;
   an auxiliary lubricant circuit configured to supply lubricant to the primary lubricant circuit to supplement a lubricant supply;
   a pressure responsive control valve disposed within the primary lubricant circuit for controlling lubricant flow between the primary lubricant circuit and the auxiliary lubricant circuit;
   a primary pressure sensor disposed within the primary lubricant circuit before the pressure responsive control valve;
   an auxiliary pump and a pressure sensor configured to monitor a pressure within the auxiliary lubricant circuit separate from a pressure within the primary lubricant circuit; and
   a check valve downstream of an outlet of the auxiliary pump and before the pressure responsive control valve, the check valve preventing lubricant flow into the auxiliary lubricant circuit from the primary lubricant circuit.

8. The turbofan engine as recited in claim 7, wherein the pressure sensor is configured to generate a signal indicative of a pressure between the outlet of the auxiliary pump and the check valve.

9. The turbofan engine as recited in claim 8, including a controller configured to receive the signal from the pressure sensor and programmed to indicate a fault condition responsive to the signal indicating a pressure below a predefined threshold pressure.

10. The turbofan engine as recited in claim 9, wherein the pressure responsive control valve configured to control lubricant flow between the primary lubricant circuit and the auxiliary lubricant circuit responsive to a reduction in pressure within the primary lubricant circuit below a predetermined threshold.

11. The turbofan engine as recited in claim 7, including an auxiliary lubricant supply configured to receive lubricant flowing through the geared architecture for supplying lubricant to the auxiliary lubricant pump.

12. A method of monitoring a lubrication system for a turbofan engine comprising:
   separating lubricant pressure within a primary lubricant circuit from pressure within an auxiliary lubricant circuit with a check valve disposed after an outlet of an auxiliary pump and before a pressure responsive valve controlling lubricant flow from the auxiliary lubricant circuit to the primary lubricant circuit; and
   monitoring the pressure within the auxiliary lubricant circuit separate from lubricant within the primary lubricant circuit with a pressure sensor within the auxiliary lubricant circuit between the outlet of the auxiliary pump and the check valve.

13. The method as recited in claim 12, including communicating a signal indicative of pressure within the auxiliary circuit to a controller and indicating a fault condition of the auxiliary pump responsive to the indicated pressure being outside predefined limits.

* * * * *

UNITED STATES PATENT AND TRADEMARK OFFICE
CERTIFICATE OF CORRECTION

PATENT NO. : 10,107,142 B2
APPLICATION NO. : 14/917970
DATED : October 23, 2018
INVENTOR(S) : Mastro Page 1 of 1

It is certified that error appears in the above-identified patent and that said Letters Patent is hereby corrected as shown below:

In the Claims

Claim 7, Column 8, Line 2; replace "the axis" with --an axis--

Claim 10, Column 8, Line 34; replace "valve configured" with --valve is configured--

Claim 13, Column 8, Line 57-58; replace "auxiliary circuit" with --auxiliary lubricant circuit--

Signed and Sealed this
Fifteenth Day of February, 2022

Drew Hirshfeld
*Performing the Functions and Duties of the*
*Under Secretary of Commerce for Intellectual Property and*
*Director of the United States Patent and Trademark Office*